(12) United States Patent
Leimenstoll et al.

(10) Patent No.: US 9,410,013 B2
(45) Date of Patent: Aug. 9, 2016

(54) HOT MELTS

(75) Inventors: Marc Leimenstoll, Hilden (DE);
Sebastian Doerr, Duesseldorf (DE);
Christos Karafilidis, Leverkusen (DE);
Peter Reichert, Dormagen (DE)

(73) Assignee: Covestro Deutschland AG (DE)

( * ) Notice: Subject to any disclaimer, the term of this patent is extended or adjusted under 35 U.S.C. 154(b) by 969 days.

(21) Appl. No.: 12/936,068

(22) PCT Filed: Mar. 27, 2009

(86) PCT No.: PCT/EP2009/002259
§ 371 (c)(1),
(2), (4) Date: Oct. 1, 2010

(87) PCT Pub. No.: WO2009/121527
PCT Pub. Date: Oct. 8, 2009

(65) Prior Publication Data
US 2011/0028582 A1   Feb. 3, 2011

(30) Foreign Application Priority Data
Apr. 3, 2008   (DE) .......................... 10 2008 017 036

(51) Int. Cl.
*C08G 18/70* (2006.01)
*C08G 18/42* (2006.01)
*C08G 18/76* (2006.01)
*C08K 5/21* (2006.01)

(52) U.S. Cl.
CPC .......... *C08G 18/706* (2013.01); *C08G 18/4202* (2013.01); *C08G 18/4216* (2013.01); *C08G 18/4238* (2013.01); *C08G 18/7671* (2013.01); *C08K 5/21* (2013.01); *C08G 2170/20* (2013.01)

(58) Field of Classification Search
CPC . C08J 9/008; C08G 18/4202; C08G 18/4216; C08G 18/4238; C08G 18/706; C08G 18/7671; C08G 2170/20; C08K 5/21; C08L 75/04

USPC ........... 528/44, 59, 61, 68, 78; 521/134, 137, 521/130, 159, 172; 560/25, 26, 115, 158; 564/44, 45

See application file for complete search history.

(56) References Cited

U.S. PATENT DOCUMENTS

| | | | |
|---|---|---|---|
| 5,019,638 A | 5/1991 | Müller et al. | |
| 5,922,809 A * | 7/1999 | Bhat et al. | ...................... 525/131 |
| 6,767,958 B2 | 7/2004 | Laas et al. | |
| 7,659,338 B2 | 2/2010 | Musch et al. | |
| 7,919,552 B2 * | 4/2011 | Grahl | .................. C08G 18/2825 524/385 |
| 2003/0022973 A1 * | 1/2003 | Hung et al. | .................... 524/270 |
| 2005/0137309 A1 * | 6/2005 | Musch | ............... C08G 18/0823 524/432 |
| 2005/0239956 A1 * | 10/2005 | Spyrou | .............. C08G 18/1875 524/589 |
| 2008/0182928 A1 * | 7/2008 | Grahl | .................. C08G 18/2825 524/284 |
| 2008/0182946 A1 * | 7/2008 | Dorr | .................. C08G 18/0866 525/452 |
| 2008/0185098 A1 * | 8/2008 | Wu et al. | .................... 156/331.4 |

FOREIGN PATENT DOCUMENTS

| | | |
|---|---|---|
| CA | 2253119 A1 | 5/1999 |
| DE | 2446440 A1 | 4/1976 |
| DE | 3827224 A1 | 2/1990 |
| DE | 102007004769 A1 | 8/2008 |
| EP | 0354527 A2 | 2/1990 |
| EP | 0916647 A2 | 5/1999 |
| EP | 1903066 * | 3/2008 |
| GB | 1462597 A | 1/1977 |
| WO | WO-01/88006 A1 | 11/2001 |
| WO | WO-2005/063873 A1 | 7/2005 |
| WO | WO-2005/066256 A1 | 7/2005 |

* cited by examiner

*Primary Examiner* — John Cooney
(74) *Attorney, Agent, or Firm* — Drinker Biddle & Reath LLP

(57) ABSTRACT

The present invention relates to reactive preparations, comprising isocyanate-functional polyurethane building blocks, to a method for the production thereof, and to the use thereof as or in adhesives having high initial strength and high mechanical strength.

9 Claims, No Drawings

HOT MELTS

RELATED APPLICATIONS

This application is a national stage application (under 35 U.S.C. §371) of PCT/EP2009/002259filed Mar. 27, 2009, which claims benefit of German Application No. 10 2008 017 036.4, filed Apr. 3, 2008.

The present invention relates to reactive preparations containing isocyanate-functional polyurethane structural units. These preparations, which can be used inter alia as hot melts, exhibit an accelerated build-up of initial strength and elevated mechanical strength.

Reactive polyurethane preparations are a fast-growing product group within applications of polyurethanes as coating compounds, foams, sealants and, in particular, as melt adhesives, also known as hot melts.

Linear polyester and/or polyether polyols in combination with an excess of polyisocyanates, preferably diisocyanates, are preferably used for their synthesis.

The advantages of this class of products lie above all in the absence of solvent, the ability to apply the products at elevated temperatures with relatively low viscosities, to nevertheless obtain high initial strength values and after a relatively short time, because of the further reaction with moisture, to obtain bonded joints having very high heat resistance well above the application temperatures and excellent solvent resistance.

Substantial to the good range of properties of reactive polyurethane hot melts is their ability to build up cohesive strength (initial strength) very quickly as they cool, allowing the joined parts to be handled immediately after being joined. Many applications require a particularly fast build-up of strength, in order for example to allow rapid further processing with short cycle times or to be able to absorb the resilience of the substrates without detachment phenomena occurring.

As with all hot melts, only physical phenomena are responsible for the build-up of initial strength, since no substantial chemical processes can take place within the space of a few seconds or minutes. These physical processes include the sharp, ongoing rise in viscosity that occurs as the temperature falls and—where crystalline components are used—a recrystallisation effect leading to a jump in the increase in strength.

The actual curing of the reactive PU hot melts, i.e. the crosslinking reaction of the components with one another, occurs over a period of hours to days due to reaction of the isocyanate groups with atmospheric water or the bonded substrates to form polyurea. Afterwards the PU hot melts are only able to be melted or dissolved in solvents to a limited degree. For that reason the cured adhesives have good heat resistance and resistance to chemicals such as plasticisers, solvents, oils or fuels.

In order to build up initial strength quickly, polyols are used in reactive PU hot melts, the concentration of which in the hot melt is sufficiently high and whose first or second order transition (Tm or Tg) is at relatively high temperatures. It is important to make sure that the first or second order transition also takes place in the formulated hot melt and is not suppressed due to miscibility of the crystallising polyol in the complete system, for example.

Hot melts based on crystalline polyesters, as described for example in DE-A 3 827 224, are characterised by a very short open time and an associated rapid build-up of initial strength. This is achieved by the use of esters based on dodecanoic diacid, which are known to have very rapid recrystallisation kinetics and a high melting point.

It is known from WO2005/066256 that transition temperatures and recrystallisation enthalpies of high-molecular-weight, partially crystalline, thermoplastic polymers, such as polyolefins or polyesters for example, can be increased by the addition of nucleating agents. The release properties and hence the cycle times in injection moulding can be improved in this way, for example.

The effect of nucleating agent on the initial strength of high-molecular-weight, solvent-containing thermoplastic polyurethane elastomers was described in the publication "Initial Bond Strength of Polyurethane Contact Adhesives" (Adv. Urethane Sci. Tec., 1992, 11, 192-216).

However, nothing is known as yet about the effect of nano-ureas on the recrystallisation behaviour of low-molecular-weight NCO-terminated prepolymers containing crystalline or partially crystalline and/or amorphous polyol components.

The object underlying the invention was to modify formulations of reactive polyurethane hot melts in such a way that a faster build-up of initial strength occurs. This should be achieved through the fact that the crystalline and/or partially crystalline polyol component in the reactive polyurethane hot melt formulation has an elevated recrystallisation temperature.

Surprisingly it was found that by modification with nano-ureas, hot melt systems based on crystalline or partially crystalline polyester polyols or mixtures thereof with crystalline, partially crystalline, amorphous, liquid polyols or other components are characterised by a particularly rapid build-up of initial strength in comparison to formulations which have not been modified with nano-ureas.

This is particularly surprising as there is scarcely any difference in the recrystallisation temperatures of the pure polyesters with and without the addition of nano-ureas and the recrystallisation enthalpy reduces as the nano-urea content increases (Table 2).

The invention provides compositions containing a reaction product of
A) at least one aromatic, aliphatic, araliphatic and/or cycloaliphatic isocyanate, preferably having a content of free NCO groups of 5 to 60 wt. % (relative to A) and
B) a polyol or polyol mixture containing at least one polyester polyol, and a proportion of 0.001 to 50 wt. %, relative to the total amount B), of nano-urea.

The production of the compositions takes place in such a way, for example, that the polyols B) and the isocyanates A) are mixed together, the ratio of A to B being chosen such that the molar ratio of NCO to OH is greater than 1, preferably from 1.2 to 4.0, particularly preferably from 1.3 to 3.0, and the homogeneous mixture is filled or it is stirred until a constant NCO value is obtained and then filled. 60 to 150° C., preferably 80 to 130° C., is chosen as the preferred reaction temperature. Production of the preparations can also take place continuously in a series of stirred-tank reactors or suitable mixing units, such as, for example, high-speed mixers based on the rotor-stator principle or a static mixer.

It is also possible to modify the polyols or polyol mixture B) or a part thereof with a reduced amount of A) and on completion of the reaction to react the urethane group-containing polyols with an excess of A) to form an isocyanate group-containing composition.

It is likewise possible to perform the reaction of the polyols B) with the isocyanates A) in the presence of up to 5 wt. % of for example trimers of aliphatic and/or aromatic diisocyanates, such as HDI for example, or to add such trimers on completion of prepolymerisation.

The invention also provides preparations containing the compositions according to the invention and the use of the compositions according to the invention as or in e.g. sealants, coating compounds, foams, and as adhesives, in particular melt adhesives, such as for example assembly adhesive for the temporary fixing of components, as a paper adhesive in general, specifically as a bookbinding adhesive or as adhesives for the production of block bottom valve bags, composite films or laminates or as edge veneers, or in the production thereof.

The preparations according to the invention can be modified in the conventional manner by reaction with moisture-activated catalysts, other inorganic or organic fillers, nucleating agents, additives, auxiliary substances, surfactants, dyes, resins, reactive and non-reactive polymers, stabilisers, light stabilisers, antioxidants, biocides, pigments and/or extender oils.

Suitable isocyanates as the isocyanate component A) are, for example, those having isocyanate contents of 5 to 60 wt. % (relative to the isocyanate) with aliphatically, cycloaliphatically, araliphatically and/or aromatically bound isocyanate groups, such as, for example, 1,4-diisocyanatobutane, 1,6-diisocyanatohexane (HDI), 2-methyl-1,5-diisocyanatopentane, 1,5-diisocyanato-2,2-dimethylpentane, 2,2,4- and 2,4,4-trimethyl-1,6-diisocyanatohexane, 1,10-diisocyanatodecane, 1,3- and 1,4-diisocyanatocyclohexane, 1,3- and 1,4-bis-(isocyanatomethyl)cyclohexane, 1-isocyanato-3,3,5-trimethyl-5-isocyanatomethylcyclohexane (isophorone diisocyanate, IPDI), 4,4'-diisocyanatodicyclohexylmethane, 1-isocyanato-1-methyl-4(3)-isocyanatomethylcyclohexane, bis-(isocyanatomethyl)-norbornane, 1,3- and 1,4-bis-(2-isocyanato-prop-2-yl) benzene (TMXDI), 2,4- and/or 2,6-diisocyanatotoluene (TDI), 2,2'-, 2,4'- and/or 4,4'-diisocyanatodiphenylmethane (MDI), 1,5-diisocyanatonaphthalene, 1,3- and 1,4-bis-(isocyanatomethyl) benzene or mixtures thereof. Naturally polyisocyanates can also be used, examples being higher-molecular-weight compounds having isocyanurate, urethane, allophanate, biuret, iminooxadiazinetrione, oxadiazinetrione and/or uretdione groups based on the aforementioned diisocyanates.

Preferred diisocyanates as the isocyanate component A) are 1,6-diisocyanatohexane (HDI), 1-isocyanato-3,3,5-trimethyl-5-isocyanatomethylcyclohexane (isophorone diisocyanate, IPDI), 4,4'-diisocyanatodicyclohexylmethane, 2,4- and/or 2,6-diisocyanatotoluene (TDI), 2,2'-, 2,4'- and/or 4,4'-diisocyanatodiphenylmethane (MDI).

Particularly preferred diisocyanates as the isocyanate component A) are 2,4'- or 4,4'-diisocyanatodiphenylmethane (MDI) and/or a mixture thereof.

Within the context of the present invention, a polyol or polyol mixture B) is understood to be a polyol having more than one OH group, preferably two terminal OH groups. Such polyols are known to the person skilled in the art. Polyester polyols are preferred. They can be produced by known means, for example from aliphatic hydroxycarboxylic acids or from aliphatic and/or aromatic dicarboxylic acids and one or more diols.

Corresponding derivatives can also be used, such as, for example, lactones, esters of low alcohols or anhydrides. Examples of suitable starting products are succinic acid, adipic acid, suberic acid, azelaic acid, sebacic acid, dodecanoic diacid, glutaric acid, glutaric anhydride, phthalic acid, isophthalic acid, terephthalic acid, phthalic anhydride, ethylene glycol, diethylene glycol, 1,4-butanediol, 1,6-hexanediol, neopentyl glycol, ε-caprolactone.

Polyester polyols are either liquid at room temperature (glass transition temperature Tg<20° C.) or solid. Polyester polyols that are solid at room temperature are either amorphous (glass transition temperature Tg>20° C.) or crystallising.

Suitable crystallising polyesters are, for example, those based on linear aliphatic dicarboxylic acids having at least 2 carbon atoms, preferably at least 6 carbon atoms, particularly preferably 6 to 14 carbon atoms in the molecule, such as, for example, adipic acid, azelaic acid, sebacic acid and dodecanoic diacid, preferably adipic acid and dodecanoic diacid, and linear diols having at least 2 carbon atoms, preferably at least 4 carbon atoms, particularly preferably 4 to 6 carbon atoms in the molecule, preferably having an even number of carbon atoms, such as, for example, 1,4-butanediol and 1,6-hexanediol. The polycaprolactone derivatives based on bifunctional starter molecules, such as 1,6-hexanediol, for example, can likewise be cited as being particularly suitable.

Suitable amorphous polyester polyols are, for example, those based on adipic acid, isophthalic acid, terephthalic acid, ethylene glycol, neopentyl glycol and 3-hydroxy-2,2-dimethylpropyl-3-hydroxy-2,2-dimethyl propanoate.

Suitable polyester polyols that are liquid at room temperature are, for example, those based on adipic acid, ethylene glycol, 1,6-hexanediol and neopentyl glycol.

The polyethers conventionally used in polyurethane chemistry are suitable as the polyether polyol, such as, for example, the addition or mixed addition compounds of tetrahydrofuran, styrene oxide, ethylene oxide, propylene oxide, butylene oxides or epichlorohydrin, preferably of ethylene oxide and/or propylene oxide, produced using bivalent to hexavalent starter molecules such as, for example, water, ethylene glycol, 1,2-or 1,3-propylene glycol, neopentyl glycol, glycerol, trimethylolpropane, pentaerythritol, sorbitol or amines having 1 to 4 NH bonds. The bifunctional propylene oxide and/or ethylene oxide adducts and polytetrahydrofuran can be cited by preference. Such polyether polyols and their production are known to the person skilled in the art.

Nano-ureas are dispersed, crosslinked, nanoscale polyurea particles. The production of aqueous nano-urea dispersions is described in WO-A 2005/063873. Here hydrophilic isocyanates are introduced into water in the presence of a catalyst, as a result of which crosslinking takes place within the dispersed particles through urea bonds.

The production of polyol or polyol mixture B) containing nano-ureas is described in DE-A 100 200 700 4769. It comprises crosslinked nano-urea particles and at least one dispersing medium having at least one, preferably two, isocyanate group-reactive groups, the water content relative to the dispersion being 0 to 5 wt. %.

Examples of the dispersing media described are polyester polyols, polyacrylate polyols, polyurethane polyols, polycarbonate polyols, polyether polyols, polyester polyacrylate polyols, polyurethane polyacrylate polyols, polyurethane polyester polyols, polyurethane polyether polyols, polyurethane polycarbonate polyols or polyester polycarbonate polyols.

Substances are preferred as the dispersing medium which can be mixed with aqueous nano-urea dispersions and from whose mixture with the aqueous nano-urea dispersion the water can be removed, such as, for example, polyester polyols, polycarbonate polyols, polyether polyols and short-chain polyols.

Examples of suitable short-chain polyols are ethylene glycol, diethylene glycol, triethylene glycol, 1,2-propanediol, 1,3-propanediol, 1,4-butanediol, 1,3-butylene glycol, cyclohexanediol, 1,4-cyclohexanedimethanol, 1,6-hexanediol, neopentylglycol, hydroquinone dihydroxyethyl ether, bisphenol A (2,2-bis(4-hydroxyphenyl)propane), hydrogenated bisphenol A, (2,2-bis(4-hydroxycyclohexyl)propane), trimethylolpropane, glycerol, pentaerythritol or hydroxypivalic acid neopentyl glycol ester. Preferred short-chain polyols are 1,4- or 1,3-butanediol, 1,6-hexanediol or trimethylolpropane.

Examples of suitable monofunctional alcohols are ethanol, n-butanol, n-propanol, ethylene glycol monobutyl ether (2-butoxyethanol), diethylene glycol monomethyl ether, propylene glycol monomethyl ether, dipropylene glycol monomethyl ether, tripropylene glycol monomethyl ether, dipropylene glycol monopropyl ether, propylene glycol monobutyl ether, dipropylene glycol monobutyl ether, tripropylene glycol monobutyl ether, 2-ethylhexanol, 1-octanol, 1-dodecanol, 1-hexadecanol, diacetone alcohol, benzyl alcohol, amyl alcohol, cyclohexanol, furfuryl alcohol, o-cresol, m-cresol, p-cresol and phenol. Preferred monofunctional alcohols are ethylene glycol monobutyl ether, diacetone alcohol, amyl alcohol or cyclohexanol.

Polyester polyols, such as, for example, the polycondensates of diols and optionally triols and tetraols and dicarboxylic and optionally tricarboxylic and tetracarboxylic acids or hydroxycarboxylic acids or lactones known per se are particularly preferred as the dispersing medium. In place of the free polycarboxylic acids, the corresponding polycarboxylic anhydrides or corresponding polycarboxylic acid esters of low alcohols can also be used to produce the polyesters.

Examples of suitable diols are ethylene glycol, butylene glycol, diethylene glycol, triethylene glycol, polyalkylene glycols such as polyethylene glycol, also 1,2-propanediol, 1,3-propanediol, butanediol(1,3), butanediol(1,4), hexanediol(1,6) and isomers, neopentyl glycol or hydroxypivalic acid neopentyl glycol ester, with hexanediol(1,6) and isomers, neopentyl glycol and hydroxypivalic acid neopentyl glycol ester being preferred. In addition, polyols such as trimethylolpropane, glycerol, erythritol, pentaerythritol, trimethylolbenzene or tris-hydroxyethyl isocyanurate can also be used. Phthalic acid, isophthalic acid, terephthalic acid, tetrahydrophthalic acid, hexahydrophthalic acid, cyclohexane dicarboxylic acid, adipic acid, azelaic acid, sebacic acid, glutaric acid, tetrachlorophthalic acid, maleic acid, fumaric acid, itaconic acid, malonic acid, suberic acid, 2-methyl succinic acid, 3,3-diethyl glutaric acid and/or 2,2-dimethyl succinic acid can be used as dicarboxylic acids. The corresponding anhydrides can also be used as the acid source. Provided that the average functionality of the polyol to be esterified is greater than 2, monocarboxylic acids, such as benzoic acid and hexanecarboxylic acid, can additionally be used. Preferred acids are aliphatic or aromatic acids of the aforementioned type. Adipic acid, isophthalic acid and optionally trimellitic acid are particularly preferred. Hydroxycarboxylic acids which can additionally be used as reactants in the production of a polyester polyol having terminal hydroxyl groups are, for example, hydroxycaproic acid, hydroxybutyric acid, hydroxydecanoic acid, hydroxystearic acid and the like. Suitable lactones are caprolactone, butyrolactone and homologues. Caprolactone is preferred.

Particularly preferred polyester polyols are those based on adipic acid, phthalic acid, isophthalic acid and tetrahydrophthalic acid as the acid component and ethylene glycol, diethylene glycol, triethylene glycol; 1,4- or 1,3-butanediol, 1,6-hexanediol and/or trimethylolpropane as the alcohol component.

Likewise preferred as the dispersing medium are polycarbonates having hydroxyl groups, preferably polycarbonate diols, having number-average molecular weights $M_n$ of 400 to 8000 g/mol, preferably 600 to 3000 g/mol. These are obtainable by reacting carbonic acid derivatives, such as diphenyl carbonate, dimethyl carbonate or phosgene, with polyols, preferably diols. Examples of such diols are ethylene glycol, 1,2- and 1,3-propanediol, 1,3- and 1,4-butanediol, 1,6-hexanediol, 1,8-octanediol, neopentyl glycol, 1,4-bishydroxymethyl cyclohexane, 2-methyl-1,3-propanediol, 2,2,4-trimethylpentanediol-1,3, dipropylene glycol, polypropylene glycols, dibutylene glycol, polybutylene glycols, bisphenol A, tetrabromobisphenol A and lactone-modified diols of the aforementioned type. The diol component preferably contains 40 to 100 wt. % of hexanediol, with 1,6-hexanediol and/or hexanediol derivatives being preferred. Such hexanediol derivatives are based on hexanediol and have ester or ether groups in addition to terminal OH groups. Such derivatives are obtainable by reacting hexanediol with excess caprolactone or by etherifying hexanediol with itself to form dihexylene or trihexylene glycol. Instead of or in addition to pure polycarbonate diols, polyether-polycarbonate diols can also be used. Polycarbonates having hydroxyl groups are preferably linear in structure but can also easily be obtained by incorporating polyfunctional components, in particular low-molecular-weight polyols. Suitable examples for this purpose are glycerol, trimethylolpropane, hexanediol-1,2,6, butanetriol-1,2,4, trimethylolpropane, trimethylolethane, pentaerythritol, quinitol, mannitol, sorbitol, methyl glycoside or 1,3,4,6-dianhydrohexite. Preferred polycarbonates are synthesised from diphenyl carbonate or dimethyl carbonate and 1,6-hexanediol, 1,4-butanediol and methyl-1,3-propanediol.

Polyether polyols can also preferably be used as the dispersing medium. Suitable examples are the polytetramethylene glycol polyethers known per se in polyurethane chemistry, such as are obtainable by polymerisation of tetrahydrofuran by cationic ring opening. Likewise suitable polyether polyols are the addition products known per se of styrene oxide, ethylene oxide, propylene oxide, butylene oxides and/or epichlorohydrin to difunctional or polyfunctional starter molecules. All compounds known from the prior art can be used as suitable starter molecules, such as, for example, water, butyl diglycol, glycerol, diethylene glycol, trimethylolpropane, propylene glycol, sorbitol, ethylene diamine, triethanolamine, 1,4-butanediol. The use of polyether polyols synthesised from ethylene oxide, propylene oxide and butylene oxide is particularly preferred.

The polyol or polyol mixture B) containing the nano-urea particles is preferably produced by mixing the polyol or polyol mixture, which on average has at least two isocyanate group-reactive groups, with an aqueous nano-urea dispersion and then removing the water in a second step, or alternatively removing the water in parallel with the mixing process. The aqueous nano-urea dispersions to be used for this process are described in WO2005/063873.

The aqueous nano-urea dispersion and the dispersing medium can be mixed together in any order; one component can be added to the other component continuously, in portions or all at once. In a preferred variant of the process the dispersing medium and the aqueous nano-urea dispersion are first mixed together completely and then the water is removed from the mixture.

In principle it is possible to remove the water under atmospheric pressure, reduced pressure or overpressure. In a particularly preferred variant of the process the water is removed by distillation, operating under reduced pressure and/or at elevated temperature.

Other methods for separating water are also possible, such as dewatering using membrane methods, for example, or the use of water-attracting desiccants, such as e.g. silica gel or zeolites. The combination of various dewatering methods, in parallel or in succession, is also possible. Separation of the water with the aid of additives is also possible, for example the admixture of entraining agents for the simplified removal of water by distillation.

In the preferred process the aqueous nano-urea dispersion is preferably mixed together with the non-aqueous dispersing medium by mixing with a stirrer. Other mixing methods, for example by means of forced circulation, static mixer, shaker, rotation of a vessel, barrel mixer, jet disperser, rotor and stator, or under the influence of ultrasound, are also possible. Mixing takes place at temperatures of between 0° C. and 150° C., preferably between 10° C. and 120° C. and particularly preferably between 20° C. and 100° C. It is performed at temperatures at which the dispersing medium is in liquid form.

If the water is removed by distillation, temperatures of between 20° C. and 200° C., preferably between 25° C. and 150° C. and particularly preferably between 40° C. and 100° C. are chosen. If the water is removed under vacuum, the pressure is generally set to between 1 and 900 mbar, preferably between 2 and 500 mbar, particularly preferably between 5 and 100 mbar. The use of temperature and/or pressure profiles is also possible. Suitable times for the duration of the dewatering process are, for example, between 10 minutes and 24 hours, preferably between 30 minutes and 16 hours. During removal of the water, mixing of the mixture is preferably continued, for example by stirring and/or forced circulation.

In a particularly preferred variant of the process according to the invention the liquid or molten dispersing medium is placed in an agitator and the aqueous nano-urea dispersion is added dropwise whilst stirring vigorously, preferred adding times being one minute to 10 hours, preferably 10 minutes to 5 hours, and stirring is then continued for a further one hour to 10 hours, then the water is removed from the dispersion by distillation and the dispersion is dried under reduced pressure.

Co-solvents, defoaming agents, surface-active detergents and other auxiliary substances and additives can also be used in the production of the nano-urea dispersion. If volatile co-solvents are used, they can be removed again from the nano-urea dispersion, at the same time as the water is removed, for example.

Aqueous nano-urea dispersions are obtainable by introducing hydrophilised polyisocyanates into water and then breaking down the free isocyanate groups that are present to the primary amine by means of an isocyanate-water reaction. These amino groups then react with further isocyanate groups to form urea groups and crosslink as a consequence to form nano-urea particles in the form of aqueous dispersions. It is possible in principle that before or during the reaction with water, NCO groups of the hydrophilised polyisocyanates are also reacted with other isocyanate-reactive compounds such as primary or secondary amines and/or alcohols.

All NCO group-containing compounds known to the person skilled in the art which are hydrophilised non-ionically or potentially ionically can be used as hydrophilised polyisocyanates. If mixtures of various polyisocyanates of the aforementioned type are used, it is preferable for at least one polyisocyanate to have a non-ionically hydrophilising structural unit. Exclusively polyisocyanates having non-ionically hydrophilising groups are particularly preferably used.

Ionically or potentially ionically hydrophilising compounds are understood to be all compounds having at least one isocyanate-reactive group and at least one functionality, such as, for example, —COOY, —SO$_3$Y, —PO(OY)$_2$ (Y for example =H, NH$_4^+$, metal cation), —NR$_2$, —NR$_3^+$ (R=H, alkyl, aryl), which on interaction with aqueous media enter into a pH-dependent dissociation equilibrium and in this way can be negatively, positively or neutrally charged. Preferred isocyanate-reactive groups are hydroxyl or amino groups.

Such polyisocyanates are obtainable by methods known to the person skilled in the art in which polyisocyanates are reacted with non-ionically and/or ionically or non-ionically or potentially ionically hydrophilising compounds having at least one isocyanate-reactive group.

Suitable ionically or potentially ionically hydrophilising compounds are, for example, mono- and dihydroxycarboxylic acids, mono- and diaminocarboxylic acids, mono- and dihydroxysulfonic acids, mono- and diaminosulfonic acids and mono- and dihydroxyphosphonic acids or mono- and diaminophosphonic acids and salts thereof such as dimethylolpropionic acid, dimethylolbutyric acid, hydroxypivalic acid, N-(2-aminoethyl)-β-alanine, 2-(2-aminoethylamino) ethanesulfonic acid, ethylene diaminepropyl- or -butylsulfonic acid, 1,2- or 1,3-propylene diamine-β-ethylsulfonic acid, malic acid, citric acid, glycolic acid, lactic acid, glycine, alanine, taurine, lysine, 3,5-diaminobenzoic acid, an addition product of IPDI and acrylic acid (EP-A 0 916 647, example 1) and the alkali and/or ammonium salts thereof; the adduct of sodium bisulfite to butene-2-diol-1,4, polyethersulfonate, the propoxylated adduct of 2-butenediol and NaHSO$_3$, described for example in DE-A 2 446 440 (page 5-9, formula and compounds which contain structural units which can be converted into cationic groups, for example amine-based structural units, such as N-methyl diethanolamine, as hydrophilic structural components. Cyclohexylaminopropanesulfonic acid (CAPS), as in WO2001/88006, for example, can also be used as the hydrophilising compound or structural unit.

Preferred ionic or potential ionic compounds are those having carboxy or carboxylate and/or sulfonate groups and/or ammonium groups. Particularly preferred ionic compounds are those containing carboxyl and/or sulfonate groups as ionic or potentially ionic groups, such as the salts of N-(2-aminoethyl)-β-alanine, 2-(2-aminoethylamino)ethane-sulfonic acid or the addition product of IPDI and acrylic acid (EP-A 0 916 647, example 1) and of dimethylol propionic acid.

Suitable non-ionically hydrophilising compounds are, for example, polyoxyalkylene ethers containing at least one hydroxy or amino group. These polyethers preferably contain a proportion of 30 wt. % to 100 wt. %, relative to the total content of alkylene oxide units, of ethylene oxide units.

Preferred non-ionically hydrophilising compounds are those having the formula (I),

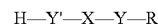   (I)

in which
R stands for a monovalent hydrocarbon radical having 1 to 12 carbon atoms, preferably an unsubstituted alkyl radical having 1 to 4 carbon atoms,
X stands for a polyalkylene oxide chain having 5 to 90, preferably 20 to 70 links, which consist of at least 40 wt. %, preferably at least 65 wt. %, particularly preferably 55 to 89 wt. %, relative to the total content of alkylene oxide units, of ethylene oxide units, and which in addition to ethylene oxide units can also contain propylene oxide, butylene oxide or styrene oxide units, propylene oxide units being preferred, and
Y',Y stands for oxygen or for —NR'—, R' being equal to R or H.

The non-ionically hydrophilising compounds preferably correspond to the aforementioned type, wherein they have a number-average molecular weight of at least 400 g/mol, preferably at least 500 g/mol and particularly preferably 1200 to 4500 g/mol.

The aliphatic, cycloaliphatic, araliphatic and aromatic polyisocyanates known per se to the person skilled in the art, having more than one NCO group per molecule and an isocyanate content of 0.5 to 50 wt. %, preferably 3 to 30 wt. %, particularly preferably 5 to 25 wt. %, or mixtures thereof, can be used to produce the hydrophilised polyisocyanates substantial to the invention.

Examples of suitable polyisocyanates are butylene diisocyanate, tetramethylene diisocyanate, cyclohexane-1,3- and 1,4-diisocyanate, hexamethylene diisocyanate (HDI), 1-isocyanato-3,3,5-trimethyl-5-isocyanatomethylcyclohexane (isophorone diisocyanate, IPDI), 2,4,4-trimethylhexamethylene diisocyanate, isocyanatomethyl-1,8-octane diisocyanate, methylene bis-(4-isocyanatocyclohexane), tetramethylxylylene diisocyanate (TMXDI) or triisocyanatononane (TIN, 4-isocyanatomethyl-1,8-octane diisocyanate) and mixtures thereof. Also suitable in principle are aromatic polyisocyanates such as 1,4-phenylene diisocyanate, 2,4- and/or 2,6-toluoylene diisocyanate (TDI), diphenylmethane-2,4'- and/or 4,4'-diisocyanate (MDI), triphenylmethane-4,4'-diisocyanate or naphthylene-1,5-diisocyanate.

In addition to the aforementioned polyisocyanates, higher-molecular-weight secondary products having a uretdione, isocyanurate, urethane, allophanate, biuret, iminooxadiazinedione and/or oxadiazinetrione structure can also be used. Such secondary products are obtainable from the monomeric diisocyanates in a manner known per se by means of the modification reactions described in the prior art.

Hydrophilised polyisocyanates or mixtures thereof having exclusively aliphatically or cycloaliphatically bound isocyanate groups are preferred.

The hydrophilised polyisocyanates are particularly preferably based on hexamethylene diisocyanate, isophorone diisocyanate, the isomeric bis-(4,4'-isocyanatocyclohexyl) methanes and mixtures of the aforementioned diisocyanates, wherein in the case of mixtures, those having 50 parts by weight of polyisocyanates based on hexamethylene diisocyanate are preferred.

Introduction of the hydrophilised polyisocyanates into water and the subsequent reaction with water to produce the nano-urea dispersions is preferably carried out with mixing, using a stirrer or other mixing method, such as forced circulation, static mixer, barrel mixer, jet disperser, rotor and stator, or under the influence of ultrasound.

In principle, a modification of NCO groups with isocyanate-reactive compounds such as primary or secondary amines or (poly)alcohols can also take place during or after dispersion. Examples are ethylene diamine, 1,3-propylene diamine, 1,6-hexamethylene diamine, isophorone diamine, 4,4'-diaminodicyclohexylmethane, hydrazine, 1,4-butanediol, 1,4-cyclohexanedimethanol, 1,6-hexanediol, trimethylolethane, trimethylolpropane, glycerol, N-methylethanol and N-methylisopropanol amine, 1-aminopropanol or diethanolamine.

The molecular ratio of NCO groups of the hydrophilised polyisocyanates to water is preferably 1 to 100 to 1 to 5, particularly preferably 1 to 30 to 1 to 10.

In principle it is possible to introduce the hydrophilised polyisocyanates into the water in one portion. A continuous addition of the hydrophilised polyisocyanate, for example over a period of 30 minutes to 20 hours, is likewise possible. An addition in portions is preferred, wherein the number of portions is 2 to 50, preferably 3 to 20, particularly preferably 4 to 10, and the portions can be of the same or different sizes.

The waiting time between the individual portions is typically 5 minutes to 12 hours, preferably 10 minutes to 8 hours, particularly preferably 30 minutes to 5 hours.

A continuous addition of the hydrophilised polyisocyanate distributed over a period of 1 hour to 24 hours, preferably 2 hours to 15 hours, is likewise possible.

In the production of urea particles the reactor temperature is 10 to 80° C., preferably 20 to 70° C. and particularly preferably 25 to 50° C.

Following the reaction of the hydrophilised polyisocyanate with water, the reactor is preferably evacuated at internal temperatures of 0° C. to 80° C., preferably 20° C. to 60° C. and particularly preferably 25° C. to 50° C. Evacuation is performed down to an internal pressure of 1 to 900 mbar, preferably 10 to 800 mbar, particularly preferably 100 to 400 mbar. The duration of this venting subsequent to the actual reaction is 1 minute to 24 hours, preferably 10 minutes to 8 hours. Venting is also possible by raising the temperature without evacuation.

The nano-urea dispersion is preferably mixed in parallel with the evacuation, for example by stirring.

Production of the aqueous nano-urea dispersion can take place in the presence of catalysts.

Suitable catalysts for this purpose are, for example, ammonia, iron(II) chloride, zinc chloride, tin salts, tetraalkylammonium hydroxides, alkali hydroxides, alkali alcoholates, alkali salts of long-chain fatty acids having 10 to 20 carbon atoms and optionally lateral OH groups, lead octoate or tertiary amines such as triethylamine, tributylamine, dimethylbenzylamine, dicyclohexylmethylamine, dimethylcyclohexylamine, N,N,N',N'-tetramethyldiaminodiethyl ether, bis-(dimethylaminopropyl) urea, N-methyl or N-ethyl morpholine, N,N'-dimorpholinodiethyl ether (DMDEE), N-cyclohexyl morpholine, N,N,N',N'-tetramethyl ethylenediamine, N,N,N',N'-tetramethyl butanediamine, N,N,N',N'-tetramethyl hexanediamine-1,6, pentamethyl diethylenetriamine, dimethyl piperazine, N-dimethylaminoethyl piperidine, 1,2-dimethylimidazole, N-hydroxypropylimidazole, 1-azabicyclo-(2,2,0)-octane, 1,4-diazabicyclo-(2,2,2)-octane (Dabco) or alkanolamine compounds, such as triethanolamine, triisopropanolamine, N-methyl and N-ethyl diethanolamine, dimethyl aminoethanol, 2-(N,N-dimethylaminoethoxy) ethanol or N-tris-(dialkylaminoalkyl) hexahydrotriazines, e.g. N,N',N-tris-(dimethylaminopropyl)-s-hexahydrotriazine. If tertiary amines are used, it is possible to separate the catalyst off again after production of the nano-urea dispersion, by distillation for example.

Tin dioctoate, tin diethyl hexoate, dibutyl tin dilaurate or dibutyldilauryl tin mercaptide, 3-dimethyl-3,4,5,6-tetrahydropyrimidine, tetramethylammonium hydroxide, triethylamine, sodium hydroxide, sodium methylate or potassium isopropylate are preferred. The particularly preferred catalyst is ammonia.

The catalysts are used in quantities of 0.01 to 8 wt. %, preferably 0.05 to 5 wt. %, particularly preferably 0.1 to 3 wt. %, relative to the total solids content of the resulting dispersion.

The catalyst can be mixed with the hydrophilised polyisocyanates prior to being introduced into the water or mixed with the dispersing water or added to the water only after dispersion of the hydrophilised polyisocyanates. It is preferable to mix the catalyst into the dispersing water prior to adding the hydrophilised polyisocyanates. It is also possible to divide the catalyst into portions and to add it at different stages of the reaction course.

Defoaming agents, surface-active detergents and other auxiliary substances and additives can also be used in the production of the polyol or polyol mixture B) containing nano-ureas. Other additives from areas such as paint, sealant or adhesive formulation, such as pigments or fillers for example, can also be added.

EXAMPLES

Unless otherwise noted, all percentages relate to percentages by weight.

Unless otherwise noted, all analytical measurements relate to temperatures of 23° C.

The specified particle sizes were determined by laser correlation spectroscopy (using a Malvern Zetasizer 1000, Malvern Instruments Limited).

The check for free NCO groups was performed by IR spectroscopy (band at 2260 cm-1).

Water determination was carried out by means of Karl Fischer titration in accordance with DIN 51777 Part 1. In the absence of amines, buffering with benzoic acid is performed.
Chemicals
Bayhydur® VP LS 2336 (Bayer MaterialScience AG, Leverkusen, DE):
Hydrophilised polyisocyanate based on hexamethylene diisocyanate, solvent-free, viscosity approx. 6800 mPas, isocyanate content approx. 16.2%, Bayer MaterialScience AG, Leverkusen, DE.
Isofoam® 16 (Petrofer-Chemie, Hildesheim, DE):
Defoaming Agent The other chemicals were ordered from the fine chemicals business of Sigma-Aldrich GmbH, Taufkirchen, DE.
Production of an Aqueous Nano-Urea Dispersion N)

820.20 g of Bayhydur® VP LS 2336 followed by 0.32 g of Isofoam® 16 were added to a solution of 20.72 g of triethylamine in 4952 g of deionised water at 30° C. with vigorous stirring, and stirring was continued. After 3, 6 and 9 hours a further 820.20 g of Bayhydur® VP LS 2336 followed by 0.32 g of Isofoam® 16 were added and stirring was then continued at 30° C. for a further 4 hours. Stirring was then continued for a further 3 hours under a vacuum of 200 mbar and at 30° C. and the resulting dispersion was filled.

The resulting white aqueous dispersion had the following properties:
Particle size (LCS): 83 nm
Viscosity (viscometer, 23° C.): <50 mPas
pH (23° C.): 8.33

In the examples and comparative examples the following polyols were used:
Polyester A:
Polyester polyol based on adipic acid and 1,6-hexanediol having a hydroxyl value of about 30 mg KOH/g and an acid value of about 0.5 mg KOH/g. Production takes place in a manner known to the person skilled in the art and is described for example in Ullmanns Enzyklopädie der technischen Chemie, "Polyester", 4th Edition, Verlag Chemie, Weinheim, 1980.
Polyester B:
500 g of a polyester A) are placed in an agitator with distillation column at 55° C. 39.6 g of dispersion N) are added dropwise whilst stirring within 20 minutes. Evacuation is performed at approx. 20 mbar whilst stirring. The temperature of the heating bath is raised incrementally to 100° C. until no further water passes over. Evacuation is then continued at approx. 1 mbar for about a further 3 hours in a rotary evaporator at 70° C. The water content (corresponding to Karl Fischer) was 0.075%.

Polyester C:
1800 g of a polyester A) are placed in an agitator with distillation column at 60° C. 460 g of dispersion N) are added dropwise whilst stirring within 30 minutes. Evacuation is performed at approx. 20 mbar whilst stirring. The temperature of the heating bath is raised incrementally to 100° C. until no further water passes over. Stirring is then continued at approx. 2 mbar for about a further 3 hours at the same temperature. The water content (corresponding to Karl Fischer) was 0.08%.
Polyester D:
Polyester polyol based on adipic acid, isophthalic acid, neopentyl glycol and ethylene glycol having a hydroxyl value of about 55 mg KOH/g and an acid value of about 0.5 mg KOH/g. Production takes place in a manner known to the person skilled in the art and is described for example in Ullmanns Enzyklopädie der technischen Chemie, "Polyester", 4th Edition, Verlag Chemie, Weinheim, 1980.
Polyester E:
Polyester polyol based on dodecanoic diacid and 1,6-hexanediol having a hydroxyl value of about 30 mg KOH/g and an acid value of about 0.5 mg KOH/g. Production takes place in a manner known to the person skilled in the art and is described for example in Ullmanns Enzyklopädie der technischen Chemie, "Polyester", 4th Edition, Verlag Chemie, Weinheim, 1980.
Polyether A:
Vorano® P 400, The DOW Chemical Company, Midland, Mich., USA
Stabiliser S:
Irganox® 1010, Ciba Spezialiätenchemie Lampertheim GmbH, Lampertheim, DE.
Isocyanate I:
Desmodur® 44M (4,4'-diphenylmethane diisocyanate), Bayer MaterialScience AG, Leverkusen, DE
Production of the Reactive Polyurethane Hot Melts (Examples and Comparative Examples):

Comparative example 1 and examples 1 and 2 were performed with a constant of 2.20. To determine the initial strength of a formulation of relevance in practice containing nano-urea-modified polyesters, the urethane group contents were kept constant (U=0.66 mol/kg, examples 3 and 4 and comparative example 2). This resulted in differing quantity structures for hot melts containing nano-urea-modified polyesters (examples 1 to 4) in comparison to hot melts containing no nano-urea-modified polyesters (comparative examples 1 and 2).

The proportions of polyol specified in Table 1 were placed in a 2-litre surface-ground beaker, melted at 130° C. and then dewatered for 1 hour at 130° C. and under a partial vacuum of 15 mbar (+/−10 mbar). The corresponding amount of isocyanate I is then added. After a stirring-in time of approx. 20 min the products are filled into aluminium cartridges, which are sealed with an airtight seal. The cartridges are then conditioned at a temperature of 100° C. in a circulating-air drying oven for 4 hours.

TABLE 1

Composition of the examples and comparative examples:

| Name | Reactant | Proportion [wt. %] |
|---|---|---|
| Comparative example 1 | Isocyanate I | 12.48 |
| | Polyester A | 87.52 |
| Comparative example 2 | Isocyanate I | 15.2 |
| | Polyester A | 32.5 |
| | Polyester D | 16.2 |

TABLE 1-continued

Composition of the examples and comparative examples:

| Name | Reactant | Proportion [wt. %] |
|---|---|---|
| | Polyester E | 32.5 |
| | Polyether A | 3.3 |
| | Stabiliser S | 0.3 |
| Example 1 | Isocyanate I | 11.84 |
| | Polyester B | 88.16 |
| Example 2 | Isocyanate I | 10.57 |
| | Polyester C | 89.43 |
| Example 3 | Isocyanate I | 14.2 |
| | Polyester B | 32.9 |
| | Polyester D | 16.4 |
| | Polyester E | 32.9 |
| | Polyether A | 3.3 |
| | Stabiliser S | 0.3 |
| Example 4 | Isocyanate I | 12.9 |
| | Polyester C | 33.4 |
| | Polyester D | 16.7 |
| | Polyester E | 33.4 |
| | Polyether A | 3.3 |
| | Stabiliser S | 0.3 |

Determination of Physical Transformations:

The determination of physical transformations such as melting points or glass transition temperatures is carried out by measuring the heat tonality with a Pyris Diamond DSC calorimeter from Perkin-Elmer. The temperature is calibrated using indium and lead, the heat tonality using indium. Nitrogen at a flow rate of 30 ml/min is used as the purge gas. Cooling takes place over liquid nitrogen. The temperature gradient is 20 K/min. Measurements are performed in the temperature range between −100° C. and +150° C. The weighed sample portions are between 9.5 and 11.4 mg sample weight in Al cups (standard crucibles). The results are set out in Table 2.

Determination of the Shear Strength of Beech Bonded Joints:

Sheets of beech measuring 40×20×5 mm, which have been stored at 23° C. and 50% relative humidity, are used to produce the test pieces. The product to be characterised contained in the cartridge is melted at 120° C. for 45 minutes in a circulating air drying oven and the contents are then applied to the wooden test pieces clamped in a special mould as a bead of adhesive using a cartridge gun. The mould is then sealed. The mould ensures an overlap length of 10 min, an adhesive surface area of 2 cm² and a glueline thickness of 0.8 mm. After a defined time the test pieces are removed from the mould and then measured at 23° C. and 50% relative humidity in a tensile shear test. To determine the initial strength values the test pieces are checked after 5, 10, 30, 60 and 120 minutes. The final strength values are determined after 14 days. For each product, five test pieces are produced and measured and the individual results determined. The results are set out in Table 3.

Rheological Characterisation of the Reactive Polyurethane Hot Melts:

Prior to examination, the products, which are filled into aluminium cartridges, are melted in a circulating air oven at approx. 125° C. for approx. 30 min. For measurement of the viscoelastic characteristics of polyurethane hot melts the measurements are performed at a fixed frequency of 1 Hz. For measurement at a constant cooling rate the temperature is lowered from 130° C. to 0° C. at a rate of 2 K/min. Since the specimens shrink as they cool, the measurement must be performed using a rheometer having an "auto tension" function. For the purposes of evaluation the temperature at two different storage moduli (G') was used. The upper and lower limits of the Dahlquist band known from the literature for pressure sensitive adhesives were chosen for this (G'=5×104 mPas and G'=5×105 mPas respectively).

Since the cooling rate of 2 K/min does not correspond to the real cooling rate of a hot melt during application, setting measurements are performed, which have a markedly higher cooling rate. For the setting measurement the molten, hot PU hot melt is quickly transferred to a cold (room temperature) measuring container and rheological measurements are performed immediately at room temperature. The cooling rate results accordingly from cooling due to ambient temperature and in the first minute is approximately 40 to 80 K/min. The rheological behaviour is recorded over time. The time taken to reach a modulus of G'=1×106 mPas was chosen as a measure of the build-up of strength by the system.

The viscoelastic properties of the reactive polyurethane hot melts are characterised with a VOR-Melt rheometer from BOHLIN Instruments using an oscillation program and the 25HT plate/plate system. The instrument is used to characterise the viscoelastic properties of high-viscosity substances such as plastic melts, rubbers, etc., as a function of temperature and frequency.

Results:

The transition temperatures for the pure polyesters and polyesters containing nano-urea obtained from DSC examinations are set out in Table 2. The shear strengths from the characterisation of beech bonded joints are shown in Table 3 and the rheological characterisations in Table 4.

TABLE 2

Transition temperatures of polyesters containing nano-ureas:

| Polyester | $T_m$ [° C.] | $T_{cryst}$ [° C.] | $\Delta H_{cryst}$ [J/g] |
|---|---|---|---|
| A | 56.8 | 38.0 | −92.3 |
| B | 54.8 | 36.0 | −83.3 |
| C | 56.0 | 38.5 | −78.3 |

TABLE 3

Shear strengths of beech bonded joints in N/mm2 after curing at 23° C. and 50% relative humidity and for varying cure times

| Time [min] | | Comp. example 1 | Comp. example 2 | Example 1 | Example 2 | Example 3 | Example 4 |
|---|---|---|---|---|---|---|---|
| 5 | [MPa] | 1.93 | 2.36 | 2.92 | 2.18 | 2.88 | 3.83 |
| 10 | [MPa] | 2.18 | 3.10 | 2.99 | 2.99 | 3.31 | 4.65 |
| 30 | [MPa] | 2.36 | 3.27 | 3.17 | 5.34 | 4.11 | 5.17 |
| 60 | [MPa] | 2.95 | 3.94 | 4.05 | 5.45 | 4.39 | 5.29 |
| 120 | [MPa] | 3.45 | 3.80 | 4.50 | 6.85 | 5.02 | 5.62 |

TABLE 4

Cooling behaviour of reactive PU hot melts at various cooling rates.
(Constant cooling rate of 2 K/min and according to setting test (starting
temperature in each case 130° C.):

| | Constant cooling rate | | Setting test |
|---|---|---|---|
| | $G' = 5 \times 10^4$ Pa [° C.] | $G' = 5 \times 10^5$ Pa [° C.] | $G' = 1 \times 10^6$ Pa [° C.] |
| Comparative example 1 | 40.5 | 39.5 | 17.0 |
| Example 1 | 42.0 | 41.0 | 16.0 |
| Example 2 | 43.5 | 41.5 | 11.0 |
| Comparative example 2 | 52.7 | 50.6 | 10.4 |
| Example 3 | 53.6 | 52.0 | 10.3 |
| Example 4 | 53.7 | 52.0 | 10.1 |

Discussion of the Results:

Table 2 compares the transition temperatures of the pure polyester A without nano-urea modification with those of the pure polyesters B and C containing nano-urea, measured in each case by DSC. It is clear that the nano-ureas have no significant influence on the melting point. Observation of the crystallisation temperatures likewise reveals no significant influence.

In the tensile shear tests, however, surprisingly improved strength values are determined for hot melts containing nano-urea-modified polyesters (Table 3).

A surprisingly increased initial strength of a hot melt containing nano-urea-modified polyester in comparison to a hot melt containing no nano-urea-modified polyester can also be observed by means of rheological analytical methods (Table 4). The upper and lower limit of the Dahlquist criterion with a constant cooling rate is achieved at higher temperatures with hot melts containing nano-urea-modified polyester (examples 1 to 4) than with hot melts containing no nano-urea-modified polyester (comparative examples 1 and 2). The effect of the nano-urea-modified polyester on the initial strength is also apparent at high cooling rates (setting test).

The presence of nano-urea in low-molecular-weight NCO-terminated polyurethane prepolymers constitutes a critical advantage in use, since these systems reach the Dahlquist range at an early stage owing to their increased recrystallisation tendency. This means that in comparison to the existing systems they achieve initial strength values that are sufficient to allow the substrates to be bonded to be held in position with no mechanical fixing at an earlier stage.

The invention claimed is:

1. Preparations based on reaction products of isocyanates, the reaction products having crystalline or partially crystalline polyester polyols, optionally mixed with crystalline, partially crystalline, amorphous or liquid polyols or other components, characterised in that they contain nano-ureas;
   wherein the reaction product is at least one reaction product of
   A) at least one aromatic, aliphatic, araliphatic and/or cycloaliphatic isocyanate, and
   B) a polyol or polyol mixture containing at least one polyol and 0.001 to 50 wt. %, relative to the total amount B), of nano-urea,
   wherein the ratio of A to B is chosen such that the molar ratio of NCO to OH is greater than 1.

2. Preparations according to claim 1 wherein the ratio of A to B is chosen such that the molar ratio of NCO to OH is 1.2 to 4.0.

3. A coating compound comprising the preparation of claim 1.

4. A sealant comprising the preparation of claim 1.

5. An adhesive comprising the preparation of claim 1.

6. A melt adhesive comprising the preparation of claim 1.

7. A paper adhesive comprising the preparation of claim 1.

8. Process for the production of preparations according to claim 1, characterised in that the polyols B) and the isocyanates A) are mixed together, the ratio of A to B being chosen such that the molar ratio of NCO to OH is greater than 1, and the homogeneous mixture thus obtained is filled immediately into a cartridge or is stirred until a constant NCO value is reached and then filled into a cartridge.

9. Preparations according to claim 1, wherein the at least one aromatic, aliphatic, araliphatic and/or cycloaliphatic isocyanate has a content of free NCO groups of 5 to 60 weight % (relative to A).

* * * * *